INVENTOR.
WILLIAM F. MORGAN

July 16, 1963   W. F. MORGAN   3,097,857
CHUCKING CYLINDER VALVE
Filed Feb. 26, 1962   3 Sheets-Sheet 2

INVENTOR.
WILLIAM F. MORGAN
BY Woodling, Krost,
Granger and Rust
ATTORNEYS

July 16, 1963

W. F. MORGAN 3,097,857

CHUCKING CYLINDER VALVE

Filed Feb. 26, 1962

INVENTOR.
WILLIAM F. MORGAN
BY Woodling, Krost, Granger and Rust
ATTORNEYS

United States Patent Office 3,097,857
Patented July 16, 1963

3,097,857
CHUCKING CYLINDER VALVE
William F. Morgan, Euclid, Ohio, assignor to The National Acme Company, a corporation of Ohio
Filed Feb. 26, 1962, Ser. No. 175,717
13 Claims. (Cl. 279—4)

The invention relates in general to chucking cylinder valve systems and, more particularly, to a valve for chucking cylinders on a rotatable spindle wherein a fluid distributor is necessary to supply fluid to the chucking cylinder.

In machine tools having rotatable spindles, it is often found desirable to supply hydraulic or other fluid pressure thereto for actuation of machine tool components such as applying fluid to a cylinder and piston assembly to provide axial movement to actuate a chuck mechanism. The chuck grips a workpiece to be worked in the machine tool. As the machine performs its work cycle, the workpieces must periodically be removed and new ones loaded, hence, the chuck must be actuated periodically and this may be accomplished by the cylinder and piston. Since the chuck must rotate, the cylinder for actuating the chuck may also rotate. Still further, where the spindle is one of a multiplicity of spindles, they are carried in a machine element termed a spindle carrier and the entire spindle carrier is journalled for rotation in the typical multiple spindle machine tool. Accordingly, fluid supplied to chucking cylinders on each spindle must, therefore, pass through a distributor on the spindle and also pass through a central or main distributor on the spindle carrier.

Machine tools are generally adapted to be used with both external and internal chucks for gripping either the external or internal surfaces of a workpiece and, thus, where the same general type of chuck mechanism is used, but with different jaws thereon for external and internal gripping, the direction of movement of the chucking cylinder must be reversed to provide chucking for an external jaw chuck as opposed to an internal jaw chuck.

Accordingly, the invention contemplates the use of a chucking cylinder and distributor assembly for use in a rotatable machine tool spindle wherein a chucking cylinder is co-axial and rotatable with the spindle and a piston in the cylinder is connected to actuate a chuck mechanism on the spindle. A distributor is co-axial with the spindle and a valve is fixed relative to one of the distributor housing and shaft. Conduit means is used to connect a control port of the valve with a chamber at one end of the chucking cylinder. The valve has a spool which is movable between first and second positions and has duct means connecting a first inlet port of the valve to the control port with the valve spool in the first position and has second duct means connecting a second inlet port in the valve to the control port with the valve spool in the second position.

An object of the invention is to provide a four-way valve which selectively controls fluid flow to a chucking cylinder for a rotatable chuck so that the chucking cylinder may properly actuate either an external or an internal chuck.

Another object of the invention is to provide a selectable position valve plus a distributor assembly to selectively supply fluid to either end of a fluid cylinder and piston assemlby connected to actuate a rotatable chuck.

Another object of the invention is to provide a means to make certain that whether an external chuck or an internal chuck is used on a machine tool, the chuck actuating mechanism is always actuating in the correct direction.

Another object of the invention is to provide a four-way valve in connection with a chuck actuator so that the selection of the position of the valve changes the position of the actuator independently of any selection of the chucked or unchucked control functions of the chucking mechanism.

Other objects and a fuller understanding of the invention may be had by referring to the following description and claims, taken in conjunction with the accompanying drawings, in which:

Figure 1:
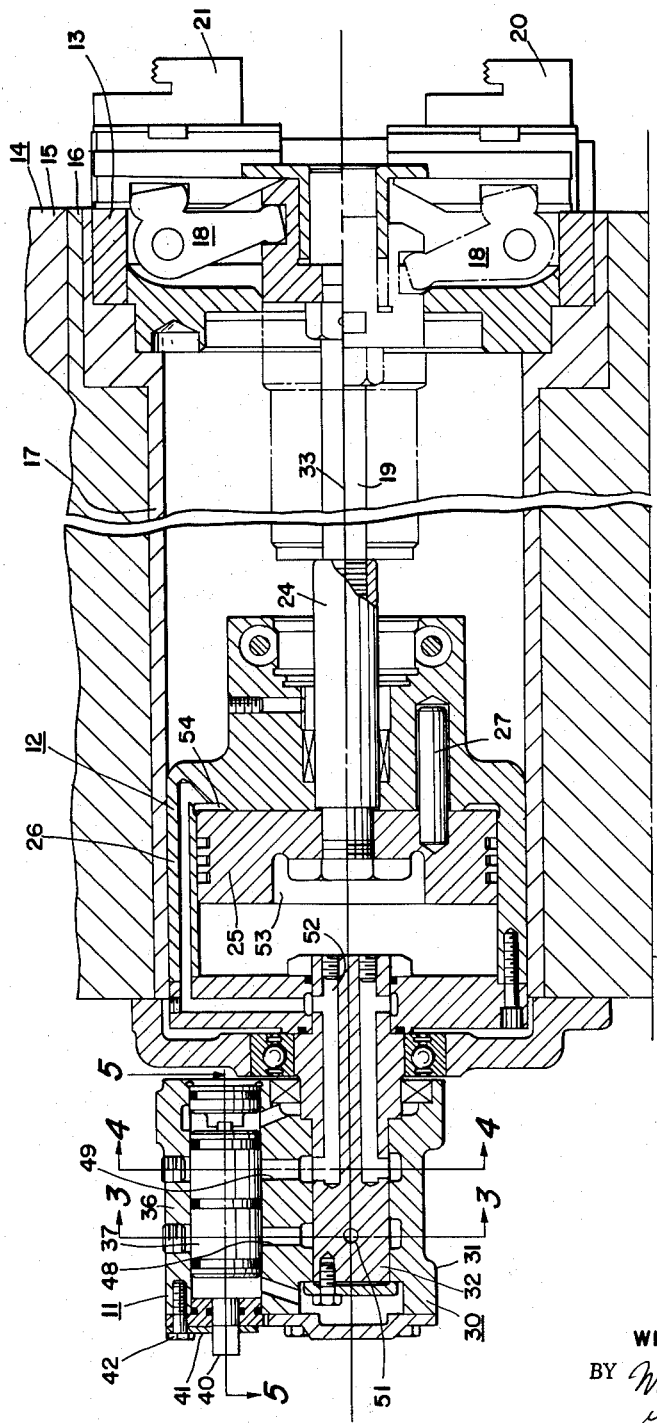
FIGURE 1 is a longitudinal sectional view to a reduced scale of a part of a machine tool embodying the invention and including a chucking cylinder, a distributor and selector valve controlling a chuck, with alternative external or internal jaws.

The invention contemplates use of a selector valve 11 in connection with a fluid actuator 12 for a chuck 13. For purposes of illustration but not limitation, the selector valve 11 has been shown in connection with a machine tool 14 having a base 15 journalling a spindle carrier 16 in which a multiplicity of spindles 17 are journalled for rotation. One such spindle 17 is shown and is typical of all spindles in the multiple spindle machine 14. There may be four, six or eight such spindles, for example. The spindle 17 carries the chuck 13 which has chuck actuating mechanism 18 therein including a draw rod 19 to actuate jaws 21 on the chuck 13. The jaws 21 are shown as internal jaws and FIGURE 1 also shows that alternatively the chuck 13 may carry external jaws 20 actuated by the same actuating mechanism 18. Thus, whether a workpiece is to be externally or internally chucked or gripped, the same chuck 13 may be used merely utilizing the proper jaws 20 or 21. The rearward end of the draw rod 19 is connected to a piston rod 24 connected to a piston 25 in a chucking cylinder 26. The cylinder 26 and piston 25 thus form the fluid actuator 12. The cylinder 26 is mounted in the spindle 17 for rotation therewith and a lock pin 27 assures rotation of the piston 25 with the cylinder 26.

Figure 2:
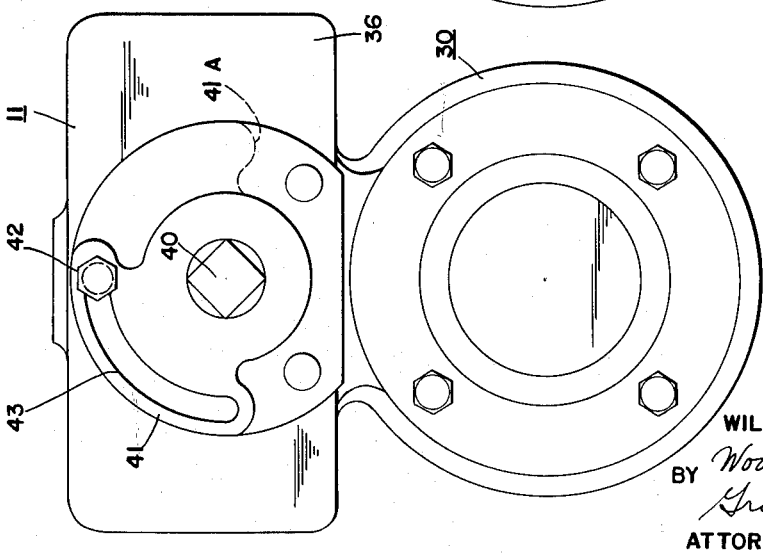
FIGURE 2 is a partial rear view of FIGURE 1.
Figure 5:
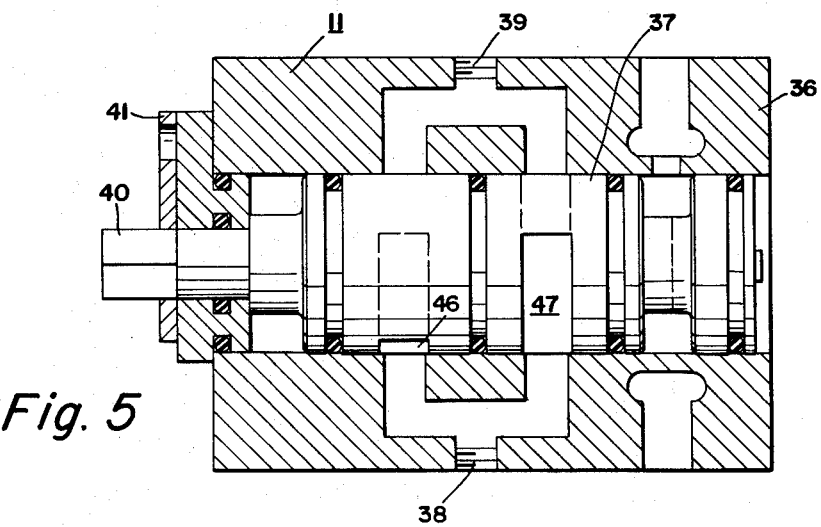
FIGURE 5 is a sectional view on line 5—5 of FIGURE 1.

A distributor 30 has a distributor housing 31 and an internal distributor shaft 32. This distributor 30 is co-axial with the spindle 17 on the axis 33 thereof. Fixedly mounted to the distributor housing 31 is the selector valve 11. This valve 11 has a valve housing 36 and an internal rotatable valve spool 37. The valve housing 36 has first and second inlet ports 38 and 39, respectively, which selectively may be utilized as fluid inlets. The valve spool 37 has an external stem 40 for external actuation between first and second positions. The external stem is square and carries a lock plate 41 for rotation therewith. A lock screw 42 is threadable in the valve housing 36 and passes through an arcuate slot 43 in the lock plate 41. The arcuate slot 43 is about 90 degrees in extent to limit the valve spool 37 to about a 90 degree arc of movement between the first and second positions. The first position of the valve spool 37 is as shown in FIGURE 2 and the second position would be as in the dotted line position 41A of the lock plate 41. This is with the valve spool 37 rotated 90 degrees clockwise. The lock screw 42 may be loosened to permit rotation of the valve spool 37 and then may be tightened to lock this selector valve 11 in the selected position.

Figure 4:
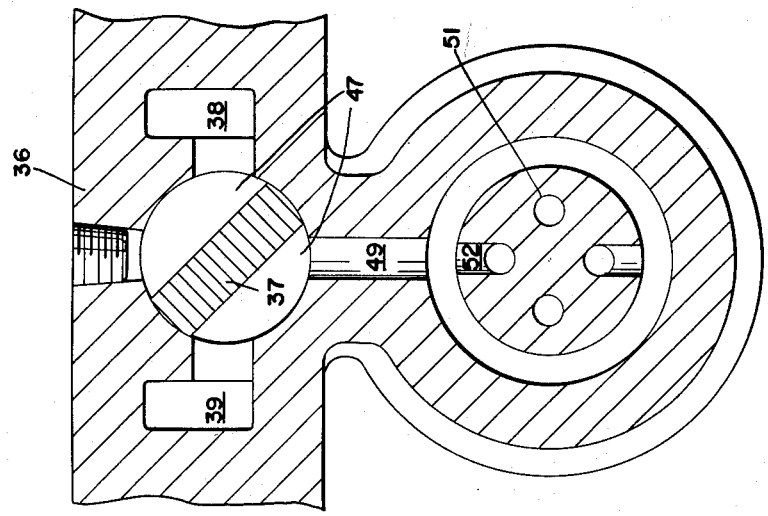
FIGURE 4 is a sectional view on line 4—4 of FIGURE 1.
Figure 3:
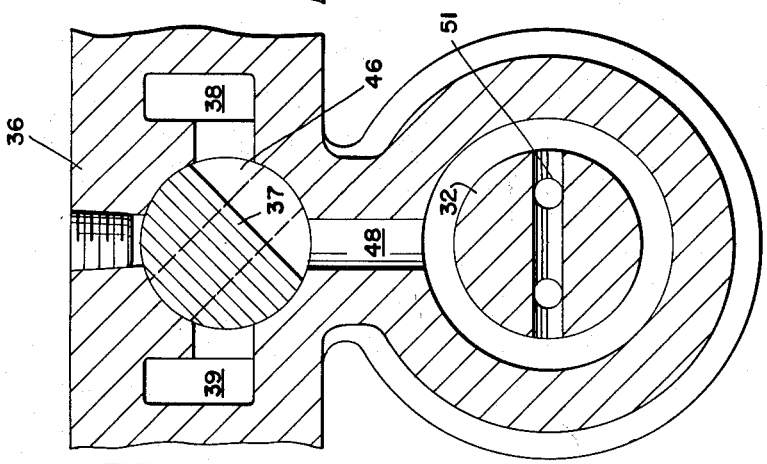
FIGURE 3 is a sectional view on lines 3—3 of FIGURE 1.

The valve spool 37 contains first and second duct means 46 and 47, respectively. The valve housing 36 contains first and second control ports 48 and 49, respectively. First conduit means 51 is provided in the distributor shaft 32 and connects the first control port 48 with a rearward chamber 53 in the chucking cylinder 26. Second conduit means 52 is provided in the distributor shaft 32 and in the chucking cylinder 26 and connects the second control port 49 with a forward chamber 54 in the chucking cylinder 26. The first position of the valved spool 37, as shown in FIGURE 2, is such that the first inlet port 38 is connected through the first duct means 46 to the first control port 48. Also, for this same rotational position, the second duct means 47 connects the second inlet port 39 with the second control port 49. In the second rotational position of the valve spool 37 the valve spool will be rotated 90 degrees clockwise as viewed in FIGURES 2, 3 and 4 and, thus, the first duct means 46 will connect the second inlet port 39 to the first control port 48 and thence through the first conduit means 51 to the rearward chamber 53. Also, for this same second position the second duct means 47 will connect the first inlet port 38 to the second control port 49 and thence through the second conduit means 52 to the forward chamber 54.

Figure 6:
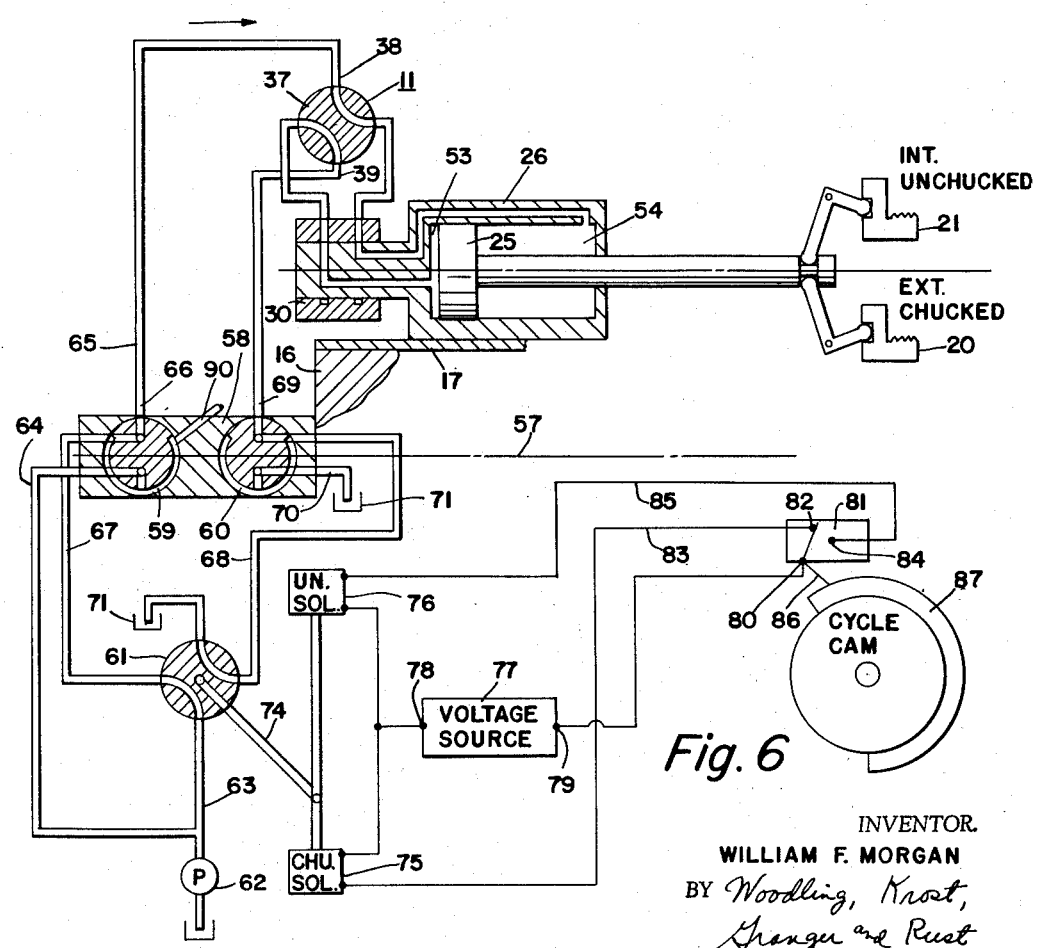
FIGURE 6 is a schematic hydraulic and electrical diagram of a machine tool incorporating the invention.

FIGURE 6 diagrammatically shows the hydraulic and electrical diagrams for the machine tool 11 wherein it will be seen that because the chucking cylinder 26 rotates and is in turn carried in a rotatable spindle carrier 16, a second distributor or spindle carrier distributor 58 is required on the spindle carrier axis 57. This is necessary to supply fluid to the rotating spindle carrier 16. In FIGURE 6 the spindle carrier distributor 58 is shown diagrammatically as including first and second selective distributor channels 59 and 60 respectively. A second four-way valve 61 is connected to receive fluid under pressure from a pump 62 by way of an inlet conduit 63. A branch 64 of this inlet conduit supplies fluid under pressure to the selective distributor channel 59. One selective outlet 66 of the second distributor 58 is in the same plane as the distributor channel 59 and connects to a conduit 65 which in turn is connected to the first inlet port 38 of the first four-way valve 11. In FIGURE 6 the valve 11 is shown in the second position, and in this case the fluid is supplied to the forward chamber 54. The selective outlet 66 is supplied through the second distributor 58 from a conduit 67 which is one of two outlet conduits from the four-way valve 61. The second outlet conduit 68 from this second valve 61 is connected to the selective outlet 69 disposed in the same plane as the selective distributor channel 60 of the second distributor 58. A conduit 70 connects the selective distributor channel 60 to a sump 71.

The second four-way valve 61 has an actuator arm 74 connected to be actuated by a chucking solenoid 75 and an unchucking solenoid 76. A voltage source 77 supplies voltage for the solenoids and is connected at one terminal 78 to both solenoids. A second terminal 79 of the voltage source is connected to the common terminal 80 of a double throw switch 81. A first switch contact 82 is connected by a lead 83 to the chucking solenoid 75 and a second switch contact 84 is connected by a lead 85 to the unchucking solenoid 76. The switch 81 has an actuator arm 86 mounted for actuation by a cycle cam 87 driven in accordance with the cycle of the machine tool 14.

*Operation*

FIGURE 6 perhaps best explains the operation of the entire machine tool 14. The cycle cam 87 is driven in accordance with drive of the machine tool 14 to control the working cycle of the machine for each of the several positions of the spindle carrier 16. The cycle cam 87 is shown as actuating the switch 81 for more than one-half the time which would be typical of a machine tool cycle requiring the spindle 16 to be in the chucked condition more than half the time. In a multiple spindle machine, one station of the spindle carrier 16 may be used for unloading the finished workpiece and loading a new workpiece. As such, the chuck 13 must be actuated to an open position and then subsequently closed. Assuming, by way of example, that external jaws 20 are used, these are shown in closed position in FIGURE 6, and FIGURE 1 shows in dot-dash lines the position of the actuating mechanism 18 to achieve this chucked position. The cycle cam 87 actuates the switch 81, as shown in FIGURE 6, to energize the chucking solenoid 75. This moves the second four-way valve 61 to the chucking position shown in FIGURE 6. In this position, fluid under pressure is supplied from the pump 62 through conduits 63 and 67 to the selective distributor outlet 66 and conduit 65 to the first inlet 38 of valve 11. FIGURE 6 shows this valve spool 37 in the second position which is the proper position for a chuck with external jaws 20. Thus, this second position of the valve 11 supplies fluid under pressure to the forward chamber 54 moving the piston 25 rearwardly to close the external chuck jaws 20.

When the cycle cam 87 rotates so that the switch 81 is no longer actuated, a circuit will be made to the switch terminal 84 which energizes the unchucking solenoid 76 with consequent de-energization of the chucking solenoid 75. This rotates the valve 61 counterclockwise and fluid under pressure is thus supplied to conduit 68 and thence to the selective distributor outlet 69 and then to the second inlet port 39 of the valve 11. From here it is directed to the rearward chamber 53 which moves the piston 25 forwardly and, hence, opens the external chuck jaws 20.

If now a workpiece is to be chucked on an internal surface, then the internal jaws 21 would be mounted on the chuck 13. This is as shown in solid lines in FIGURE 1. Also, in this case the valve 11 would be moved to the first position, as shown in FIGURES 1–5. The lock screw 42 would be loosened and the stem 40 rotated counterclockwise to its limit as established by the arcuate slot 43, and then the lock screw 42 would be tightened. This first position of the valve 11 would be illustrated in FIGURE 6 by having the valve spool 37 rotated 90 degrees counterclockwise. Accordingly, the circuit operation would be such that with the cycle cam 87 actuating the switch arm 86, the unchucking solenoid 76 would be de-energized and the chucking solenoid 75 energized to have the valve 61 in the position shown in FIGURE 6. Fluid pressure would thus be supplied through conduits 63, 67 and 65 to the first inlet 38 of valve 11. This would supply pressure fluid to the rearward chamber 53 to move the piston 25 forwardly which would close the internal chuck jaw 21. Conversely, when the cycle cam 87 no longer actuated the switch arm 86, the unchucking solenoid 76 would be energized, valve 61 would be rotated 90 degrees counterclockwise and fluid under pressure would be supplied through conduits 63, 68 and selective outlet 69 to the second inlet 39 of valve 11. Fluid pressure would then flow to the forward chamber 54 to actuate the piston 25 rearwardly to the position shown in FIGURE 6, namely to an unchucked position of the internal chuck jaws 21.

It will be noted that the pump 62 supplies pressure fluid through conduit 64 to the selective distributor channel 59 at all times. This is pressure fluid to establish the chucked condition of all the multiple spindles in the spindle carrier 16 other than the particular spindle 17 shown. There would be a plurality of selective outlets 90, one for each of the multiple spindles in the spindle carrier 16. Thus, it will be observed that for the chucked condition of the cycle cam 87, there is pressure fluid in the selective outlet 66 as well as in the selective distributor channel 59. However, for the unchucked condition of the cycle cam 87, there is still pressure fluid in the selective distributor channel 59, but selective outlet 66 is connected to the drain 71. It is for this reason that the present invention has particular advantage in multiple spindle machine tools 14 wherein, not only does the spindle 17 rotate but is also mounted in a rotatable spindle carrier 16.

It will thus be seen that the present invention provides a chuck actuating mechanism which permits ready determination of the direction of movement of the chucking cylinder piston 25 for either external or internal gripping. Also, the selective position of the valve stem 40 makes certain that no matter whether an external jaw chuck or an internal jaw chuck is used on the machine, the chuck actuating mechanism is always moved in the correct direction.

Although this invention has been described in its preferred form with a certain degree of particularity, it is understood that the present disclosure of the preferred form has been made only by way of example and that numerous changes in the details of construction and the combination and arrangement of parts may be restorted to without departing from the spirit and the scope of the invention as hereinafter claimed.

I claim:

1. In a rotatable machine tool spindle having a chuck, the provision of, a fluid actuator coaxial with and rotatable with the spindle,
means to connect said fluid actuator to a chuck mechanism for axial movement thereof to perform chucking operations with movement of said fluid actuator in one direction closing an external chuck and opening an internal chuck,
a distributor having two relatively rotatable parts with one part being coaxial with said axis of rotation and connected for rotation with said fluid actuator,
a valve fixed relative to one of said distributor parts and having a valve housing with control port means,
conduit means connecting said control port means with a chamber at one end of said fluid actuator,
said valve having a valve spool in said valve housing,
inlet port means in said valve housing communicating with said valve spool,
said valve spool being movable between first and second positions,
and duct means in said valve spool selectively connecting said inlet port means to said control port means with said valve spool in said first and second positions.

2. In a rotatable machine tool spindle having a chuck, the provision of, a fluid pressure actuator coaxial with and rotatable with the spindle,
means to connect said actuator to a chuck mechanism for axial movement thereof to perform chucking operations with movement of said actuator in one direction closing an external chuck and opening an internal chuck,
a distributor having two relatively rotatable parts with one part being coaxial with said axis of rotation and connected for rotation with said fluid actuator,
a valve fixed relative to one of said distributor parts and having a valve housing with a control port,
conduit means connecting said control port with a chamber at one end of said fluid actuator,
said valve having a valve spool in said valve housing,
first and second inlet ports in said valve housing communicating with said valve spool,
said valve spool being movable between first and second positions,
and duct means in said valve spool connecting said first inlet port to said control port with said valve spool in said first position and connecting said second inlet port to said control port with said valve spool in said second position.

3. A chucking cylinder and distributor assembly for use in a rotatable machine tool spindle having a chuck comprising, in combination, a chucking cylinder coaxial with and rotatable with the spindle,
a chuck piston in said cylinder,
means to connect said piston to a chuck mechanism for axial movement thereof to perform chucking operations with movement of said piston in one direction closing an external chuck and opening an internal chuck,
a distributor having a distributor housing and an internal distributor shaft rotatable relative thereto,
said shaft being coaxial with said axis of rotation and connected for rotation with said chucking cylinder,
a valve fixed relative to one of said distributor housing and shaft and having a valve housing with a control port,
conduit means connecting said control port with a chamber at one end of said chucking cylinder,
said valve having a valve spool in said valve housing,
first and second inlet ports in said valve housing communicating with said valve spool,
said valve spool being movable between first and second positions,
duct means in said valve spool connecting said first inlet port to said control port with said valve spool in said first position and connecting said second inlet port to said control port with said valve spool in said second position,
and means to releasably lock said valve spool in either of said first or second positions.

4. A chucking cylinder and distributor assembly for use in a rotatable machine tool spindle having a chuck comprising, in combination, a chucking cylinder coaxial with and rotatable with the spindle,
a chucking piston in said cylinder,
means to connect said piston to a chuck mechanism for axial movement thereof to perform chucking operations with movement of said piston in one direction closing an external chuck and opening an internal chuck,
a distributor having a distributor housing and an internal distributor shaft rotatable relative thereto,
said shaft being coaxial with said axis of rotation and connected for rotation with said chucking cylinder,
a valve fixed relative to one of said distributor housing and shaft and having a valve housing with first and second control ports,
first conduit means connecting said first control port with a rearward chamber in said chucking cylinder,
second conduit means connecting said second control port with a forward chamber in said chucking cylinder,
said valve having a valve spool in said valve housing,
inlet port means in said valve housing communicating with said valve spool,
said valve spool being movable between first and second positions,
first duct means in said valve spool connecting said inlet port means to said first control port with said valve spool in said first position,
second duct means in said valve spool connecting said inlet port means to said second control port with said valve spool in said second position,
and means to releasably lock said valve spool in either of said first or second positions.

5. A chucking cylinder assembly for use in a rotatable machine tool spindle having a chuck comprising, in combination, a chucking cylinder coaxial with the spindle,
a chucking piston in said cylinder,
a piston rod extending from said piston,
means to connect said piston rod to a chuck mechanism for axial movement thereof to perform chucking operations with movement of said piston rod in one direction closing an external chuck and opening an internal chuck, a four-way valve having a valve housing with first and second control ports, first conduit means connecting said first control port with a rearward chamber in said chucking cylinder, second conduit means connecting said second control port with a forward chamber in said chucking cylinder, said four-way valve having a valve spool in said valve housing, a stem on said valve spool extending externally of said valve housing, first and second inlet ports in said valve housing communicating with said valve spool, said valve spool being rotatable through an arc between first and second positions, first and second duct means in said valve spool connecting said first and second inlet ports to said first and second control ports, respectively, with said valve spool in said first position, said second position of said valve spool establishing said first and second duct means connecting said first and second inlet ports to said second and first control ports, respectively, a lock plate having an arcuate slot therein, a lock screw passing through said slot and tightenable against said lock plate, means to rotate one of said lock plate and screw with said valve spool, and means to connect the other of said lock plate and screw to said valve housing to releasably lock said valve spool in either of said first or second rotational positions.

6. A chucking cylinder and distributor assembly for use in a rotatable spindle in a rotatable spindle carrier of a multiple spindle machine tool, said spindle having a chuck comprising, in combination, a chucking actuator journalled for rotation coaxially with the spindle, means to connect said chucking actuator to a chuck mechanism for axial movement thereof to perform chucking operations with movement of said actuator in one direction closing an external chuck and opening an internal chuck, a distributor having a distributor housing and an internal distributor shaft rotatable relative thereto, said shaft being coaxial with the axis of said spindle and connected for rotation with said piston, first valve means fixed on said distributor housing and having a valve housing with first and second control ports, first conduit means in said distributor shaft connecting said first control port with a rearward chamber in said actuator, second conduit means in said distributor shaft connecting said second control port with a forward chamber in said actuator, a valve spool in said first valve means movable between first and second positions, first and second inlet ports in said valve housing communicating with said valve spool, duct means in said valve spool connecting said first and second inlet ports selectively to said first and second control ports in said first and second positions of said valve spool, a second distributor having a part rotatable with said said spindle carrier, fluid pressure means, second valve means connected to supply fluid from said fluid pressure means through said second distributor to said inlet ports of said first valve means, means connected to actuate said second valve means into first and second positions, and cycling switch means connected to said actuating means to selectively actuate said second valve means.

7. A chucking cylinder and distributor assembly for use in a rotatable spindle in a rotatable spindle carrier of a multiple spindle machine tool, said spindle having a chuck comprising, in combination, a chucking cylinder journalled for rotation coaxially with the spindle, a chucking piston in said cylinder and rotatable therewith, means to connect said piston to a chuck mechanism for axial movement thereof to perform chucking operations with movement of said piston in one direction closing an external chuck and opening an internal chuck, a distributor having a distributor housing and an internal distributor shaft rotatable relative thereto, said shaft being coaxial with the axis of said spindle and connected for rotation with said piston, a first four-way valve fixed on said distributor housing and having a valve housing with first and second control ports, first conduit means in said distributor shaft connecting said first control port with a rearward chamber in said chucking cylinder, second conduit means in said distributor shaft and in said chucking cylinder connecting said second control port with a forward chamber in said chucking cylinder, said first four-way valve having a valve spool in said valve housing, first and second inlet ports in said valve housing communicating with said valve spool, said valve spool being rotatable between first and second positions, first duct means in said valve spool connecting said first inlet port to said first control port with said valve spool in said first position and connecting said second inlet port to said first control port with said valve spool in said second position, second duct means in said valve spool connecting said second inlet port to said second control port with said valve spool in said first position and connecting said first inlet port to said second control port with said valve spool in said second position, a spindle carrier second distributor having a part rotatable with said spindle carrier, first and second distributor channels in said second distributor connected to said two inlet ports on said first four-way valve, a second four-way valve, fluid pressure means supplying fluid under pressure to said second four-way valve, conduit means connecting said second four-way valve to said second distributor channels, solenoid means connected to actuate said second four-way valve into first and second positions, and cycling switch means connected to said solenoid means to selectively actuate said second valve.

8. A chucking cylinder and distributor assembly for use in a rotatable spindle in a rotatable spindle carrier of a multiple spindle machine tool, said spindle having a chuck comprising, in combination, a chucking cylinder journalled for rotation coaxially with the spindle, a chucking piston in said cylinder and rotatable therewith, a piston rod extending forwardly from said piston, means to connect said piston rod to a chuck mechanism for axial movement thereof to perform chucking operations with rearward movement of said piston rod closing an external chuck and opening an internal chuck, a first distributor having a distributor housing and an internal distributor shaft rotatable relative thereto, said shaft being coaxial with the axis of said spindle and connected for rotation with said piston, a first four-way valve fixed on said distributor housing and having a valve housing with first and second control ports,
first conduit means in said distributor shaft connecting said first control port with a rearward chamber in said chucking cylinder,
second conduit means in said distributor shaft and in said chucking cylinder connecting said second control port with a forward chamber in said chucking cylinder,
said first four-way valve having a valve spool in said valve housing, a stem on said valve spool extending externally of said valve housing,
first and second inlet ports in said valve housing communicating with said valve spool,
said valve spool being rotatable through approximately 90 degrees between first and second positions,
first duct means in said valve spool connecting said first inlet port to said first control port with said valve spool in said first position and connecting said second inlet port to said first control port with said valve spool in said second position,
second duct means in said valve spool connecting said second inlet port to said second control port with said valve spool in said first position and connecting said first inlet port to said second control port with said valve spool in said second position,
a lock plate connected to rotate with said valve spool,
an arcuate slot of approximately 90 degrees in said lock plate,
a lock screw threadable in said valve housing through said slot to releasably lock said valve spool in either of said first or second rotational positions,
a spindle carrier second distributor having a shaft and a housing rotatable relative thereto with one thereof rotatable with said spindle carrier,
first and second selective distributor channels in said second distributor connected to said two inlet ports on said first four-way valve,
a second four-way valve fixed relative to said machine tool,
fluid pressure means supplying fluid under pressure to said second four-way valve,
conduit means connecting said second four-way valve to said spindle carrier distributor channels,
first and second solenoids connected to selectively actuate said second four-way valve into first and second positions, respectively,
a voltage source,
a cycle cam rotated in accordance with the cycle of said machine tool,
and a double throw switch actuable by said cycle cam and connected through said voltage source to said first and second solenoid to selectively energize same in accordance with actuation and de-actuation of said double throw switch.

9. A chucking cylinder and distributor assembly for use in a rotatable machine tool spindle having a chuck comprising, in combination, a chucking cylinder coaxial with and rotatable with the spindle,
a chucking piston in said cylinder,
means to connect said piston to a chuck mechanism for axial movement thereof to perform chucking operations with movement of said piston in one direction closing an external chuck and opening an internal chuck,
a distributor having a distributor housing and an internal distributor shaft rotatable relative thereto,
said shaft being coaxial with said axis of rotation and connected for rotation with said chucking cylinder,
a valve fixed relative to one of said distributor housing and shaft and having a valve housing with first and second control ports,
first conduit means connecting said first control port with a rearward chamber in said chucking cylinder,
second conduit means connecting said second control port with a forward chamber in said chucking cylinder,
said valve having a valve spool in said valve housing,
first and second inlet ports in said valve housing communicating with said valve spool,
said valve spool being movable between first and second positions,
first and second duct means in said valve spool connecting said first and second inlet ports to said first and second control ports, respectively, with said valve spool in said first position,
said second position of said valve spool establishing said first and second duct means connecting said first and second inlet ports to said second and first control ports, respectively,
and means to releasably lock said valve spool in either of said first or second positions.

10. A chucking cylinder and distributor assembly for use in a rotatable machine tool spindle having a chuck comprising, in combination, a chucking cylinder coaxial with and rotatable with the spindle,
a chucking piston in said cylinder,
means to connect said piston to a chuck mechanism for axial movement thereof to perform chucking operations with movement of said piston in one direction closing an external chuck and opening an internal chuck,
a distributor having a distributor housing and an internal distributor shaft rotatable relative thereto,
said shaft being coaxial with said axis of rotation and connected for rotation with said chucking cylinder,
a four-way valve fixed relative to one of said distributor housing and shaft and having a valve housing with first and second control ports,
first conduit means connecting said first control port with a rearward chamber in said chucking cylinder,
second conduit means connecting said second control port with a forward chamber in said chucking cylinder,
said four-way valve having a valve spool in said valve housing,
a stem on said valve spool extending externally of said valve housing,
first and second inlet ports in said valve housing communicating with said valve spool,
said valve spool being rotatable between first and second positions,
first and second duct means in said valve spool connecting said first and second inlet ports to said first and second control ports, respectively, with said valve spool in said first position,
said second position of said valve spool establishing said first and second duct means connecting said first and second inlet ports to said second and first control ports, respectively,
and means to releasably lock said valve spool in either of said first or second rotational positions.

11. A chucking cylinder and distributor assembly for use in a rotatable machine tool spindle having a chuck comprising, in combination, a chucking cylinder coaxial with and rotatable with the spindle,
a chucking piston in said cylinder,
a piston rod extending from said piston,
means to connect said piston rod to a chuck mechanism for axial movement thereof to perform chucking operations with movement of said piston rod in one direction closing an external chuck and opening an internal chuck,
a distributor having a distributor housing and having an internal distributor shaft rotatable relative thereto and coaxial with said axis of rotation and connected for rotation with said chucking cylinder,
a four-way valve fixed on said distributor housing and having a valve housing with first and second control ports, first conduit means connecting said first control port with a rearward chamber in said chucking cylinder, second conduit means connecting said second control port with a forward chamber in said chucking cylinder, said four-way valve having a valve spool in said valve housing, a stem on said valve spool extending externally of said valve housing, first and second inlet ports in said valve housing communicating with said valve spool, said valve spool being rotatable through an arc between first and second positions, first and second duct means in said valve spool connecting said first and second inlet ports to said first and second control ports, respectively, with said valve spool in said first position, said second position of said valve spool establishing said first and second duct means connecting said first and second inlet ports to said second and first control ports, respectively, a lock plate having an arcuate slot therein, a lock screw passing through said slot and tightenable against said lock plate, means to rotate one of said lock plate and screw with said valve spool, and means to connect the other of said lock plate and screw to said valve housing to releasably lock said valve spool in either of said first or second rotational positions.

12. A chucking cylinder and distributor assembly for use in a rotatable machine tool spindle having a chuck comprising, in combination, a chucking cylinder journalled for rotation coaxially with the spindle, a chucking piston in said cylinder and rotatable therewith, a piston rod extending from said piston, means to connect said piston rod to a chuck mechanism for axial movement thereof to perform chucking operations with rearward movement of said piston rod closing an external chuck and opening an internal chuck, a distributor having a distributor housing and an internal distributor shaft rotatable relative thereto, said shaft being coaxial with said axis of rotation and connected for rotation with said chucking cylinder, a four-way valve fixed on said distributor housing and having a valve housing with first and second control ports, first conduit means in said distributor shaft connecting said first control port with a rearward chamber in said chucking cylinder, second conduit means in said distributor shaft connecting said second control port with a forward chamber in said chucking cylinder, said four-way valve having a valve spool in said valve housing, a stem on said valve spool extending externally of said valve housing, first and second inlet ports in said valve housing communicating with said valve spool, said valve spool being rotatable through an arc between first and second positions, first and second duct means in said valve spool connecting said first and second inlet ports to said first and second control ports, respectively, with said valve spool in said first position, said second position of said valve spool establishing said first and second duct means connecting said first and second inlet ports to said second and first control ports, respectively, a lock plate connected to rotate with said valve spool, an arcuate slot in said lock plate, and a lock screw threadable in said valve housing through said slot to releasably lock said valve spool in either of said first or second rotational positions.

13. A chucking cylinder and distributor assembly for use in a rotatable machine tool spindle having a chuck comprising, in combination, a chucking cylinder journalled for rotation coaxially with the spindle, a chucking piston in said cylinder and rotatable therewith, a piston rod extending forwardly from said piston, means to connect said piston rod to a chuck mechanism for axial movement thereof to perform chucking operations with rearward movement of said piston rod closing an external chuck and opening an internal chuck, a distributor having a distributor housing and an internal distributor shaft rotatable relative thereto, said shaft being coaxial with said axis of rotation and connected for rotation with said piston, a four-way valve fixed on said distributor housing and having a valve housing with first and second control ports, first conduit means in said distributor shaft connecting said first control port with a rearward chamber in said chucking cylinder, second conduit means in said distributor shaft and in said chucking cylinder connecting said second control port with a forward chamber in said chucking cylinder, said four-way valve having a valve spool in said valve housing, a stem on said valve spool extending externally of said valve housing, first and second inlet ports in said valve housing communicating with said valve spool, said valve spool being rotatable through approximately 90 degrees between first and second positions, first and second duct means in said valve spool connecting said first and second inlet ports, respectively, to said first and second control ports with said valve spool in said first position, said second position of said valve spool establishing said first and second duct means connecting said first and second inlet ports to said second and first control ports, respectively, a lock plate connected to rotate with said valve spool, an arcuate slot of approximately 90 degrees in said lock plate, and a lock screw threadable in said valve housing through said slot to releasably lock said valve spool in either of said first or second rotational positions.

References Cited in the file of this patent

UNITED STATES PATENTS

| | | |
|---|---|---|
| 2,573,403 | Church | Oct. 30, 1951 |
| 3,020,057 | Gamet | Feb. 6, 1962 |